US007992545B2

(12) United States Patent
Frick et al.

(10) Patent No.: US 7,992,545 B2
(45) Date of Patent: Aug. 9, 2011

(54) PIEZOELECTRIC FUEL INJECTOR HAVING A TEMPERATURE COMPENSATING UNIT

(75) Inventors: Michael J. Frick, Newbury Park, CA (US); Michael C. Cheiky, Thousand Oaks, CA (US)

(73) Assignee: Transonic Combustion, Inc., Camarillo, CA (US)

( * ) Notice: Subject to any disclaimer, the term of this patent is extended or adjusted under 35 U.S.C. 154(b) by 0 days.

(21) Appl. No.: 12/817,136

(22) Filed: Jun. 16, 2010

(65) Prior Publication Data

US 2011/0005495 A1 Jan. 13, 2011

Related U.S. Application Data

(63) Continuation of application No. 12/503,764, filed on Jul. 15, 2009, now Pat. No. 7,762,236.

(60) Provisional application No. 61/081,326, filed on Jul. 16, 2008.

(51) Int. Cl.
*H02N 2/04* (2006.01)
*F02M 51/06* (2006.01)

(52) U.S. Cl. ......... 123/472; 310/346; 123/478; 123/490

(58) Field of Classification Search .................. 123/472, 123/478, 490; 310/315, 341–346
See application file for complete search history.

(56) References Cited

U.S. PATENT DOCUMENTS

| | | | | |
|---|---|---|---|---|
| 6,213,414 | B1 * | 4/2001 | Stier et al. | 239/584 |
| 6,260,541 | B1 * | 7/2001 | Ricci-Ottati et al. | 123/498 |
| 6,313,568 | B1 * | 11/2001 | Sullivan et al. | 310/346 |
| 6,499,471 | B2 * | 12/2002 | Shen et al. | 123/498 |
| 6,739,528 | B2 * | 5/2004 | Lorraine et al. | 239/585.1 |
| 7,032,833 | B2 * | 4/2006 | Bocking | 239/102.2 |
| 2002/0195904 | A1 * | 12/2002 | Sumrak et al. | 310/346 |
| 2009/0255508 | A1 | 10/2009 | Cheiky | |
| 2010/0017099 | A1 | 1/2010 | Becker | |
| 2010/0126471 | A1 | 5/2010 | Cheiky | |
| 2010/0176686 | A1 | 7/2010 | Diamond | |
| 2010/0180866 | A1 | 7/2010 | Becker | |
| 2010/0194238 | A1 | 8/2010 | Frick | |
| 2010/0201290 | A1 | 8/2010 | Becker | |
| 2010/0201291 | A1 | 8/2010 | Cheiky | |
| 2010/0204901 | A1 | 8/2010 | Cheiky | |

OTHER PUBLICATIONS

U.S. Appl. No. 12/778,001, filed May 11, 2010, David E. McCann.
U.S. Appl. No. 12/817,136, filed Jun. 16, 2010, Michael J. Frick.
U.S. Appl. No. 12/779,786, filed May 13, 2010, Michael C. Cheiky.
U.S. Appl. No. 12/755,591, filed Apr. 7, 2010, David E. McCann.
U.S. Appl. No. 12/534,738, filed Aug. 3, 2009, Eric Plambeck.
U.S. Appl. No. 12/721,499, filed Mar. 10, 2010, Jeffrey Bluen.

* cited by examiner

*Primary Examiner* — Erick Solis
(74) *Attorney, Agent, or Firm* — Sheppard Mullin Richter & Hampton LLP; David E. Heisey

(57) ABSTRACT

The present invention provides a fuel injector, comprising a housing having a sealable injector seat; a fuel injector pin disposed within the housing proximate) the injector seat such that the injector seat may be sealed and unsealed by displacing the fuel injector pin; a resilient element biasing the fuel injector pin in an unsealed direction; a piezoelectric actuator disposed within the housing proximal to the fuel injector pin configured to actuate to force the injector pin towards the injector seat to seal the injector seat; and a thermal compensating unit disposed within the housing proximal to the actuator and configured to compensate for thermal expansion or contraction of a component of the fuel injector.

14 Claims, 12 Drawing Sheets

PIEZOELECTRIC FUEL INJECTOR HAVING A TEMPERATURE COMPENSATING UNIT

CROSS-REFERENCE TO RELATED APPLICATIONS

This application is a continuation of U.S. patent application Ser. No. 12/503,764, filed Jul. 15, 2009, now U.S. Pat. No. 7,762,236 which claims priority from U.S. Provisional Application Ser. No. 61/081,326 filed Jul. 16, 2008, the contents of which are incorporated herein by reference in their entireties.

FIELD OF THE INVENTION

The invention broadly relates to fuel injection systems and, more particularly to a piezoelectrically actuated fuel injector having a heated and catalyzed section for engines, specifically, internal combustion engines.

BACKGROUND OF THE INVENTION

Much of the world's energy consumption is dedicated to powering internal combustion based vehicles. Most gasoline and diesel car engines are only 20-30% efficient, such that a major portion of the hydrocarbon fuels is wasted, thereby depleting global resources while producing an excessive quantity of pollutants and greenhouse gasses. With hydrocarbon fuels becoming more scare and more expensive it is desirable to obtain more efficient use of those fuels.

Typical fuel injectors may have hydraulically, electromagnetically, or piezoelectrically actuated injector pins. A piezoelectric element is a material that changes dimensions when a voltage is applied across the element. When the voltage is removed, the piezoelectric element returns to its original dimensions. When used as actuators, many piezoelectric elements are stacked together to form larger piezoelectric elements or "piezoelectric stacks" to increase the displacement of the actuator. In a piezoelectrically actuated fuel injector, one or more of these piezoelectric elements or piezoelectric stacks are used to actuate a fuel injector pin for fuel metering into an internal combustion engine.

SUMMARY OF TH INVENTION

Some embodiments of the invent on provide a fuel injector having a piezoelectrically actuated injector pin and a temperature compensator unit. In further embodiments, the injector includes both a heated portion and a catalytic portion. The injector pin contacts a seating surface that when closed prevents fuel from entering the combustion chamber of the engine. In this embodiment, a resilient element biases the injector pin in an open position and the piezoelectric actuator displaces to seal the seating surface. The temperature compensating unit is positioned at the opposite end of the injector pin. The temperature compensating unit comprises a fluid chamber that can expand or contract to position the piezoelectric element to allow accurate control of the injector assembly. The temperature compensating unit incorporates a chamber to allow for controlled fluid flow into and out of the chamber.

A further embodiment of the fuel injector according to the present invention provides a fuel injector having a piezoelectrically actuated injector pin having a catalytic portion and a temperature compensating unit. In this embodiment, a heater is not required as the fuel is heated prior to delivery to the fuel injection system.

The present invention also provides a method of dispensing fuel into a combustion chamber of an internal combustion engine. The method requires pressurizing fuel in a lower fluid chamber inside the fuel injector to a first pressure value and also pressurizing fuel in an upper fluid chamber of the fuel injector to a second pressure value. The first value is greater than the second value and this pressure differential causes the injector pin to move and allow fuel to be dispensed into the combustion chamber of the internal combustion engine.

DETAILED DESCRIPTION

In the following paragraphs, the present invention will be described in detail by way of example with reference to the attached drawings. Throughout this description, the preferred embodiment and examples illustrated should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
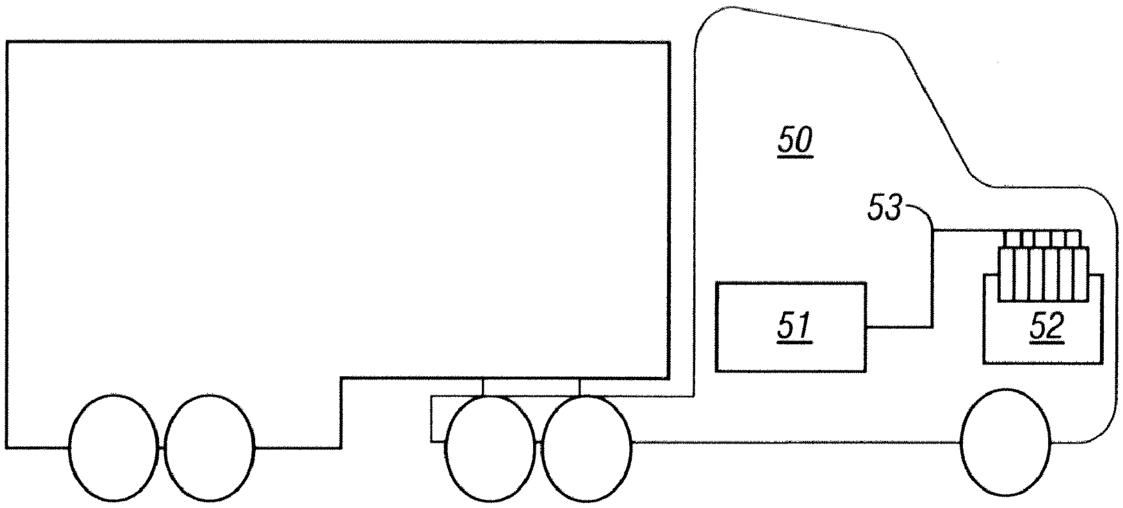
FIG. 1 illustrates an example vehicle in which an embodiment of the invention may be employed.
Figure 2:
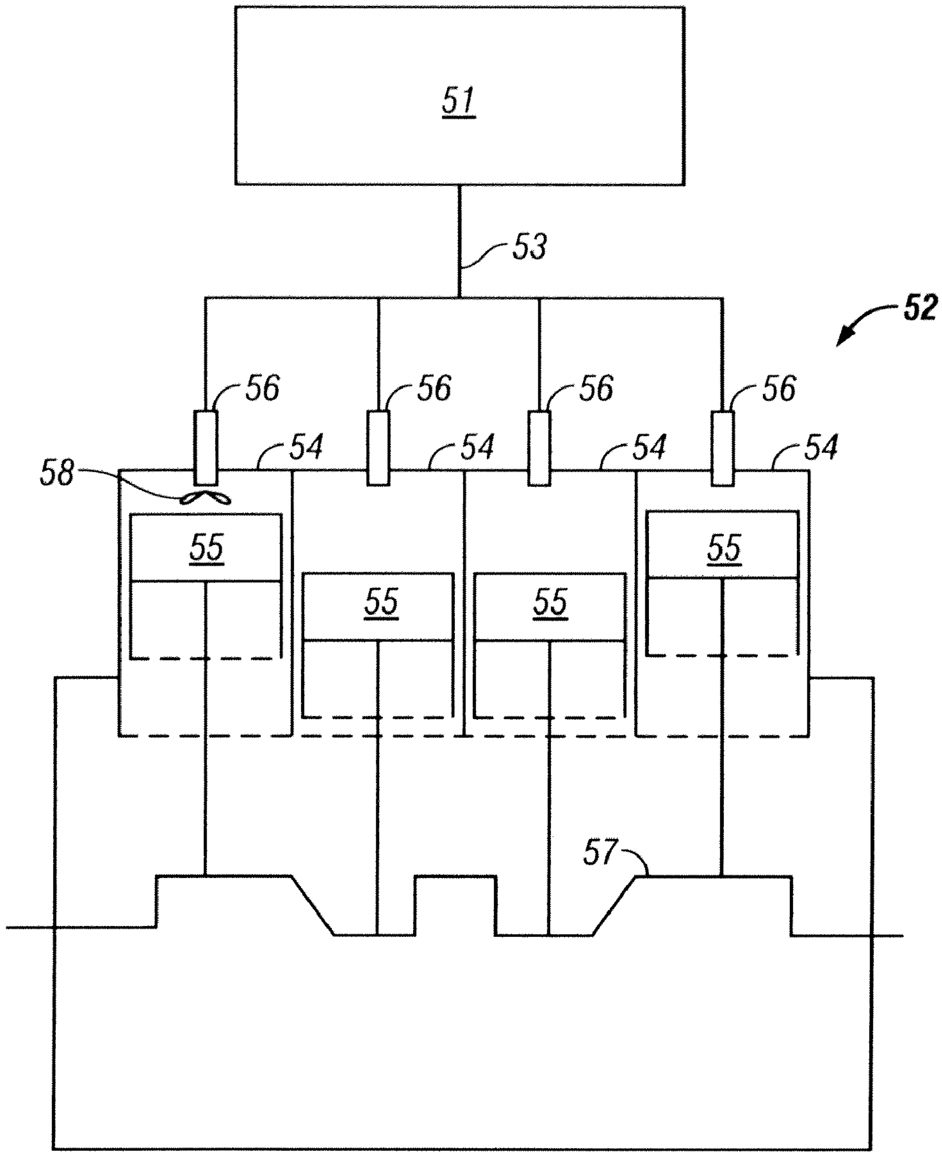
FIG. 2 illustrates an example in which an embodiment of the invention may be employed.

Before describing the invention in detail, it is useful to describe a few example environments with which the invention can be implemented. One such example is that of a vehicle powered by internal combustion engine. FIG. 1 illustrates such a vehicle 50. A fuel supply 51 is disposed within the vehicle and coupled to an engine 52 by a fuel line 53. Fuel from fuel supply 51 is used to power engine 52 to provide motive power to vehicle 50. A more particular example is that of an internal combustion engine as illustrated with respect to FIG. 2. Engine 52 comprises a plurality of cylinders 54 having pistons 55 disposed therein. A plurality of fuel injectors 56 is configured to supply fuel to engine 52 and is connected 53 to a fuel source 51. Pistons 55 and cylinders 54 are configured to form combustion chambers into which fuel 58 is metered from fuel injector 56 during a power stroke of the engine. When the fuel 58 is mixed with air and ignited, the piston 55 is displaced, thereby turning crankshaft 57 and providing motive force.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 3:
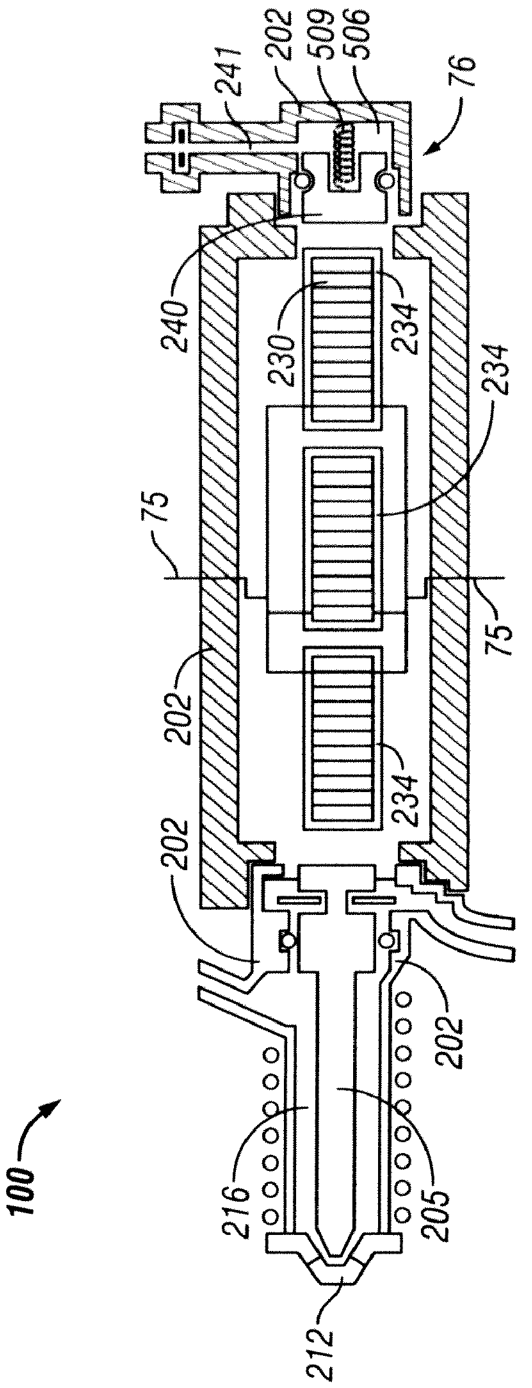
FIG. 3 illustrates a schematic section view of a fuel injector in accordance with an embodiment of the invention.

FIG. 3 illustrates a schematic view of a fuel injector 100 according to an embodiment of the invention. Fuel injector 100 comprises a housing 202 having a fuel injector pin 205 and a piezoelectric element comprising one or more piezoelectric actuator stacks 234 disposed therein. A fuel chamber 216 is formed between housing 202 and the fuel injector pin 205. Housing 202 further comprises an injection seat 212 configured to receive the injector pin such that the injector may be opened to allow fuel to be metered out or closed to prevent fuel from escaping the injector. Piezoelectric stacks 234 comprise a plurality of piezoelectric elements 230, as described herein. Piezoelectric stacks 234 are coupled to electrical line 75 to allow a voltage to be applied to stacks 234, causing them to expand and force injector pin 205 into injector seat 212, thereby sealing the fuel injector. A temperature compensating 76 comprises a temperature compensator 240 that is disposed to provide abuse against which piezoelectric elements 234 expand. Temperature compensating unit 76 further comprises a fluid chamber 506 coupled to a fluid source via inlet duct 241 to allow fluid to enter enter or exit fluid chamber 506, thereby causing fluid chamber 506 to be expanded or contracted. This expansion and contraction changes the position of temperature compensator 240, thereby changing the position of the base of piezoelectric actuator 234. In some embodiments, changes in the temperature of various components of fuel injector 100 will cause the displacement distance required to properly actuate the fuel injector pin 205 to vary. Accordingly, temperature compensating unit 76 may be configured to vary the position of actuators 234 to compensate for these changes. In further embodiments, a resilient element 509 is disposed within the housing and configured to bias temperature compensator 240 in the direction of fuel injection seat 212. In still further embodiments, viscous flow or hydraulic pressure is provided by fluid chamber 506 to allow dampened displacement of temperature compensator 240 during actuation of the fuel injector thereby compensating for a lengthening of fuel injector pin 205 caused by increased temperature.

Figure 4:
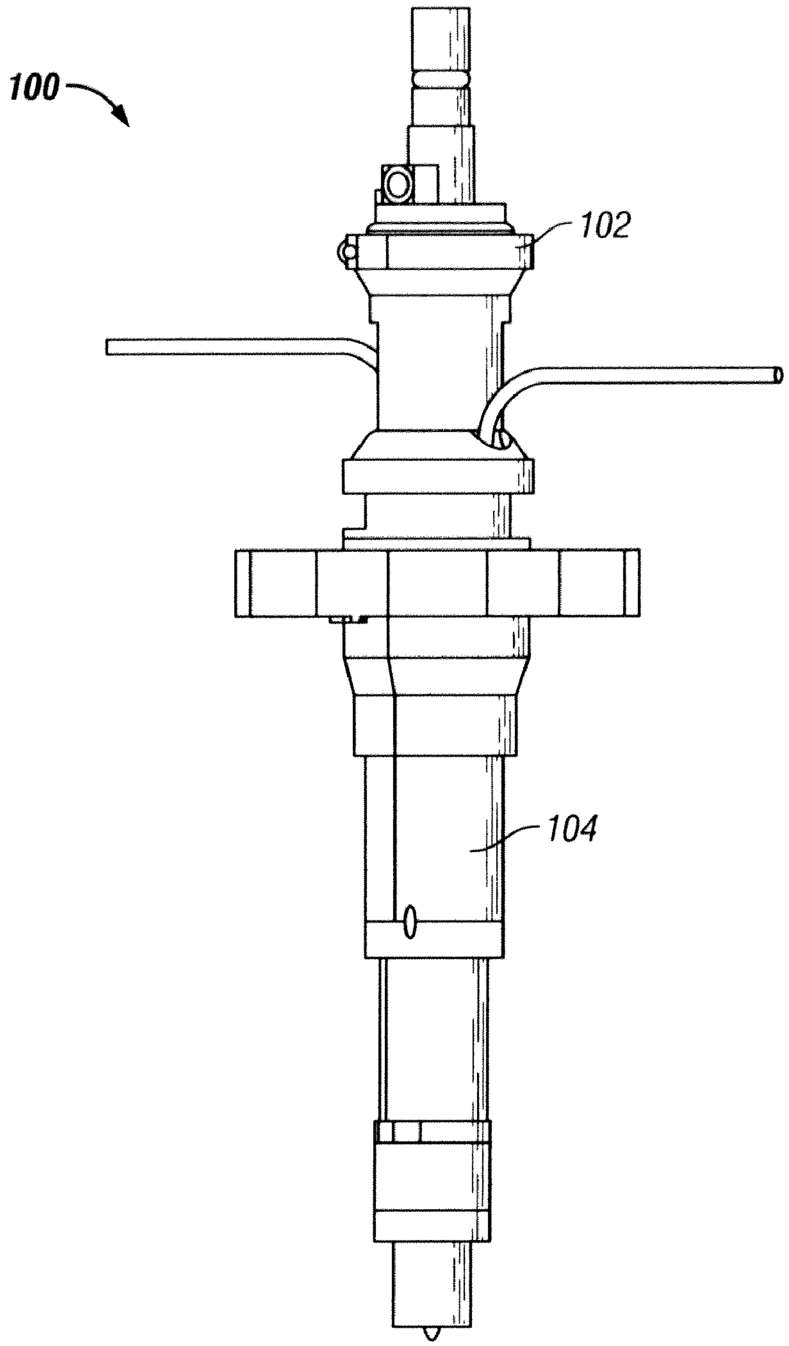
FIG. 4 illustrates an exterior view of a fuel injector in accordance with the principles of the invention.
Figure 5:
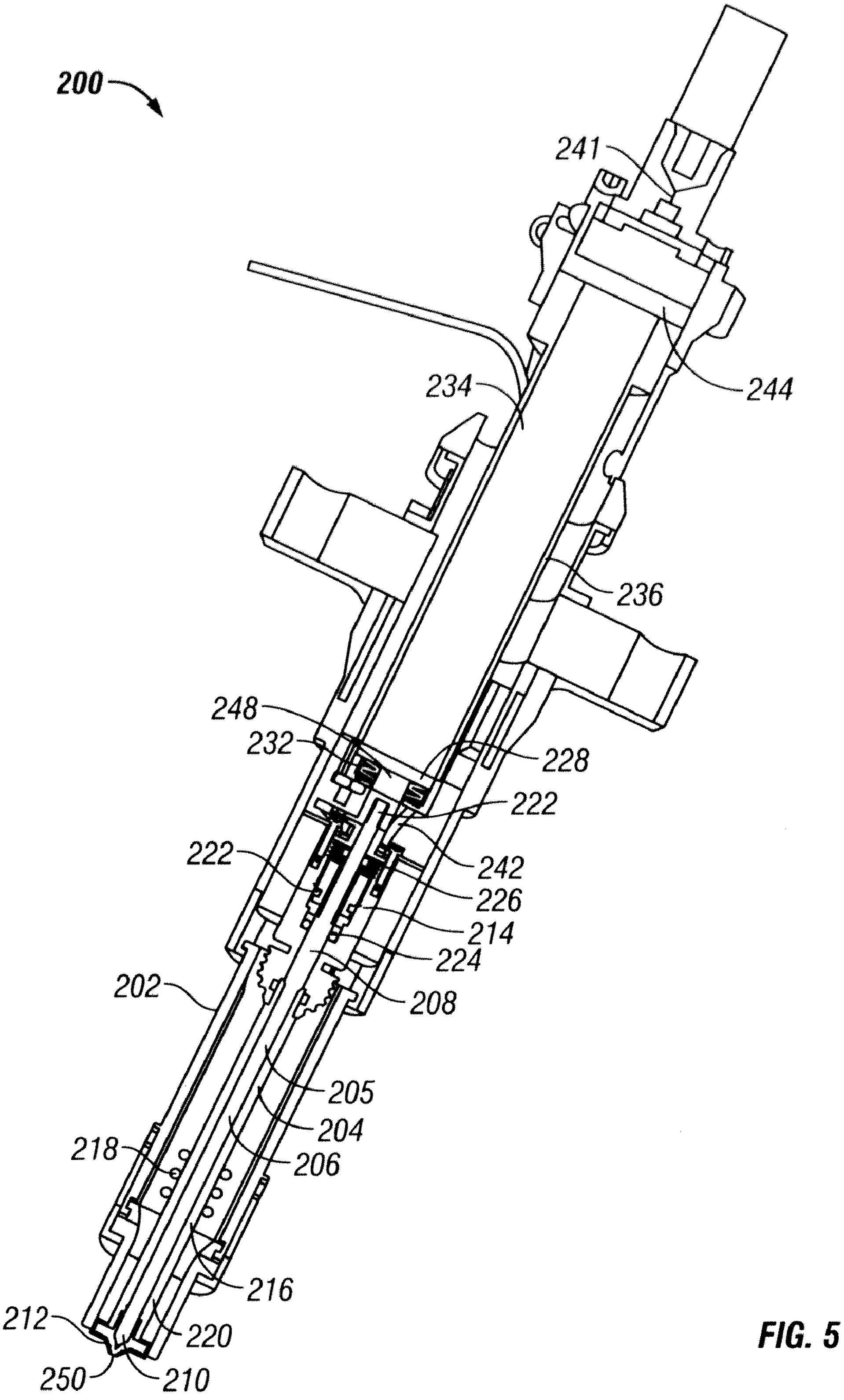
FIG. 5 illustrates a cut away view of a fuel injector in accordance with the principles of the invention.

FIG. 4 illustrates an exterior view of a fuel injector according to an embodiment. The injector pin includes a heated and catalytic portion. The injector pin contacts a seating surface and when closed prevents fuel from entering the combustion chamber of the engine. The injector pin is directly actuated by the piezoelectric element. FIG. 5 illustrates a cut-away view of a fuel injector according to an embodiment.

The injector pin assembly is contained in an outer housing that is concentric and coaxial with an inner housing. The inner housing surface allows for the sliding movement of the injector pin. A lower pin assembly and the inner surface of the inner housing form a seal to prevent fluid below the lower pin from contacting or mixing with fluid from the upper pin assembly. The lower pin and inner surface may use any appropriate sealing mechanism such as precision ground seals, bellows seals, o-ring seals, diaphragm, elastomers, or energized seals.

In one embodiment, a catalytic element can be applied to both the outer surface of the lower pin and the inner surface of the inner housing. However, only one of these surfaces may be coated in further embodiments.

The invention further includes an injector element which can be a piezoelectric element. The piezoelectric element is made up of at least one piezoelectric stack that is controlled by a controller. The piezoelectric element is directly attached to the injector pin. The individual piezoelectric stacks are retained inside the outer housing by a support structure. The piezoelectric stack has at least one resilient element biasing the injector pin into an open position. The piezoelectric stacks must be charged to close the fuel injector assembly.

A temperature compensating unit is positioned at the opposite end of the piezoelectric element from the injector pin. The temperature compensating unit is a fluid chamber that allows for the expansion and contraction of the piezoelectric element and injector pin and takes into account temperature changes. This allows for accurate control of the injector assembly. The temperature compensating unit has a chamber that allows for controlled flow of liquid fuel in and out of the chamber.

An advantage of the current invention is that the catalyst material in the fuel injector allows for oxidation of the fuel or conversion of the fuel, for example through hydrocarbon cracking, for more efficient engine operation. A further advantage of the current invention is that the use of a piezoelectric element allows for a fast acting and responsive fuel injector.

Referring to FIG. 4 a fuel injector 100 of the present invention is illustrated. The fuel injector 100 has a lower housing 104 connected to an upper housing 102. The lower 104 and upper 102 housings are connected to each other by a bayonet style connection, however, any type of fastening method can be used. The lower housing 104 has an outer housing made of stainless steel, however, any appropriate metal can be used. The outer housing has a lower portion having an injector seat. The injector seat comprises the inner surface of the outer housing, including at least one orifice that allows for fuel to exit the fuel injector 100. There can be a plurality of orifices leading out of the fuel injector 100.

FIG. 5 illustrates a cut away view of a fuel injector 200 of the present invention. Positioned concentrically inside the outer housing 202 is an inner housing 204 having a hollow inner surface for the passage of injector pin 205. The inner housing may include an inner diameter of about 4 mm, although any appropriate size may be used.

The injector pin 205 includes a lower portion 206 and an upper portion 208. The lower portion 206 has a pin tip 210 that can have a double angled surface such that when the injector is in a closed position, the pin surface contacts an injector seat 212 formed in the outer housing 202 to create a fluid tight seal. The injector seat 212 can have an included angle of between 180 degrees and 45 degrees, however, in a preferred embodiment the included angle is approximately 90 degrees. The injector seat 212 has a plurality of fuel holes or orifices below the seat surface to allow fuel to pass through when the pin tip is not in contact with the injector seat. The injector seat 212 can be formed of a high impact resistant metal, ceramic material or ceramic metallic matrix. The pin tip 210 that contacts the injector seat can be a ground seal tip or a ball seal type tip.

With continued reference to FIG. 5, the upper portion 208 includes a seal assembly 214. In the illustrated embodiment, seal assembly 214 is positioned around the upper portion of the injector pin between the lower and upper portion. Adjacent to the injector seat 212 and formed between the lower portion 206 and the inner housing is a lower fluid chamber 216. The lower fluid chamber 216 is connected to an input port and allows for pressurized fuel to be delivered to the combustion chamber of the engine.

In a preferred embodiment, the inner housing 204 adjacent the lower fluid chamber 216 contains a heating element 218. Heating element 218 may be an electrical resistance coil or heat pipe or any other suitable means to allow for controlled selective heating of the inner surface of the inner housing. Heating element 218 may have a heat shield material wrapped around the outer surface of the heating element 218 and be positioned between the heating element 218 and the outer housing 202 to insulate the heating element 218. The heat shield can be a plurality of metallic layers made of steel or other suitable heat resistant material. The heating element 218 allows for the fuel in a first fluid chamber to be heated to a temperature of 400 degrees Fahrenheit to 1400 degrees Fahrenheit, thereby causing the fuel to reach a supercritical temperature and allowing for more efficient combustion. The heating element 218 extends from the injector seat 212 to the top of the lower portion of the injector pin to form a consistent heating of the entire lower fluid chamber. Accordingly, the fuel that is present in the lower fluid chamber is predominantly in a supercritical phase. In an alternative embodiment, the fuel can be heated prior to entering the fuel injector lower fluid chamber and no heating element is necessary.

The present invention further includes a catalyst element 220 in the lower fluid chamber 216. Catalyst element 220 may be a coating, brazing, plating, surface treatment, wire winding or bonding that is attached or formed integrally with the lower portion of the injector pin and/or the inner surface of the inner housing. In the illustrated embodiment, the catalyst element 220 forms part of the outer surface of the lower portion of the injector pin. The catalyst element 220 may also be disposed on a portion of the inner wall of the inner housing 204 adjacent the lower fluid chamber 216. The fuel contained in the lower fluid chamber 216 reacts with the catalyst 220 to allow for a more efficient burning of the fuel in the combustion chamber. Preferably, the catalyst is nickel with about 5% molybdenum. However, any of the following catalysts can be used: nickel, nickel-molybdenum, alpha alumina, aluminum silicon dioxide, other air electrode oxygen reduction catalysts, and other catalysts used for hydrocarbon cracking.

Figure 6:
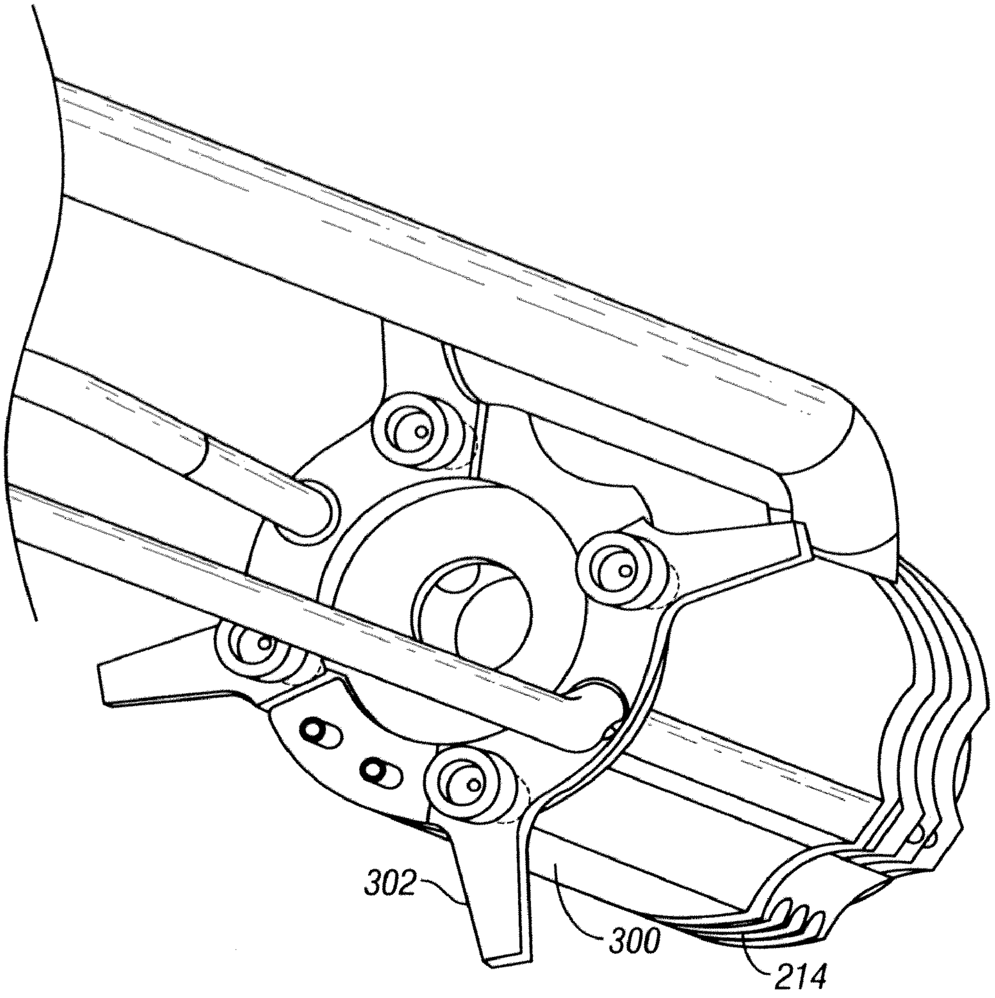
FIG. 6 is a detailed view of the seal assembly of a fuel injector in accordance with the principles of the invention.

As depicted in FIG. 5, the upper portion 208 of the injector pin is inserted through the seal assembly 214. FIG. 6 illustrates the detail of the seal assembly 214. In particular, seal assembly 214 has a body portion 300 that is positioned inside the outer housing 202. The body portion 300 can be substantially cylindrical in shape and is held a distance from the outer housing wall by a plurality of stand-off supports 302. Referring to FIG. 5, seal assembly 214 has an inner chamber 222, wherein the upper portion 208 of the injector pin 205 extends through the inner chamber 222 and a main seal 224 is formed between the upper portion 208 of the injector pin and the inner chamber sidewall of the seal body. Main seal 224 can be an o-ring, ground sliding, bellows, lip seal, wiper, labyrinth or any other appropriate sealing mechanism. In addition, a secondary backup seal 226 can be positioned adjacent the main seal 224 to function as a safety device in the event that main seal 224 fails. The secondary backup seal 226 may be made of a metallic or elastomeric material. Additionally, the secondary backup seal 226 may be a diaphragm seal. A Teflon backing ring may be positioned between the injector pin and the inner chamber sidewall adjacent the main seal 224. The main seal 224 prevents the fuel in the lower fluid chamber 216 from escaping while still allowing the pin to move in a longitudinal direction in relation to the seal assembly body portion. The body portion can have a cooling groove around its peripheral edge to aid in cooling the main seal.

Figure 7:
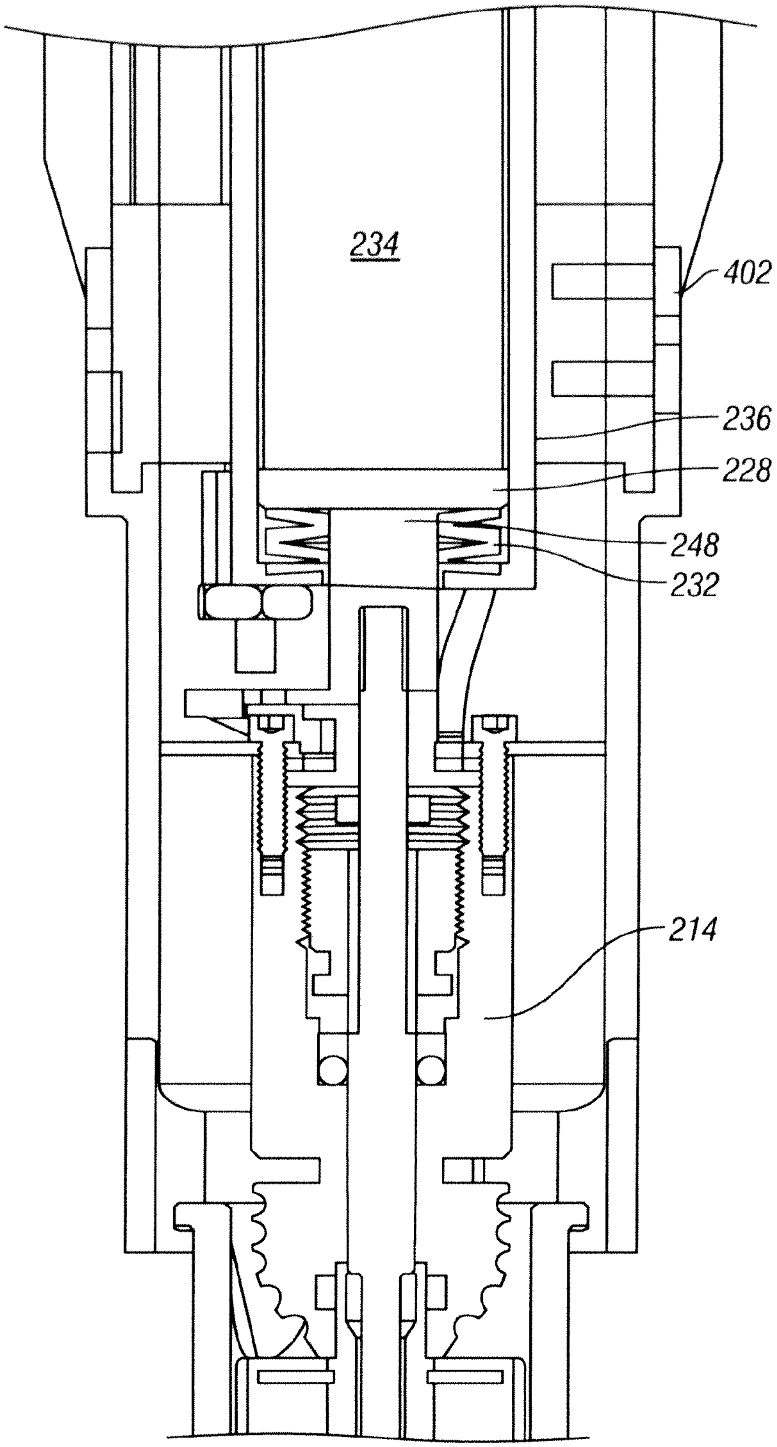
FIG. 7 is a detailed view of a portion of the seal assembly of a fuel injector in accordance with the principles of the invention.

Referring to FIG. 7, the upper portion 208 of the pin 205 extends through the seal assembly 214 to a flange section 228. The flange section 228 forms a substantially flat surface that contacts the injector element 234. In the illustrated embodiment, the flange section 228 includes a cap portion 248 positioned on top of the upper portion 208 of the injector pin 205. The cap portion 248 is cylindrical in shape and has a curved surface on the upper portion. The curved surface contacts flange section 228, which in turn contacts the injector element 234. The curved portion allows for even distribution of pressure from the injector element 234 to the injector pin 205 in the event that the pressure exerted by the injector element 234 on the flat portion is uneven. The flange section 228 and the injector pin 205 are biased in an upward direction away from the injector seat by a plurality of resilient elements 232. The resilient elements 232 can be belleville springs, coil springs, tube springs, a non-linear spring or any other suitable device.

The injector element 234 may comprise one or more piezoelectric elements 234 or stacks aligned in series or parallel configuration. The piezoelectric stacks may be lined up in series to allow for a greater degree of movement of the injector pin. The piezoelectric stacks 234 can be actuated in parallel or individually to allow for more precise control. The lower piezoelectric stack contacts the flange section 228 directly such that when a charge is supplied to the piezoelectric assembly, the lower piezoelectric stack pushes against the flange section 228 to move the injector pin 205 downward toward the fuel injector seat 212. Piezoelectric stacks 234 are housed in a shuttle 236 which is held in place in the outer housing by one or more guides 402. The shuttle 236 can be made of a temperature insensitive material, such as invar, in order to minimize load variations in the injector element 234 due to temperature changes. In an alternative embodiment, the shuttle can be cooled by an external device in order to improve the efficiency of the injector element. The upper piezoelectric stack of piezoelectric element 234 contacts a temperature compensator 240.

Figure 8:
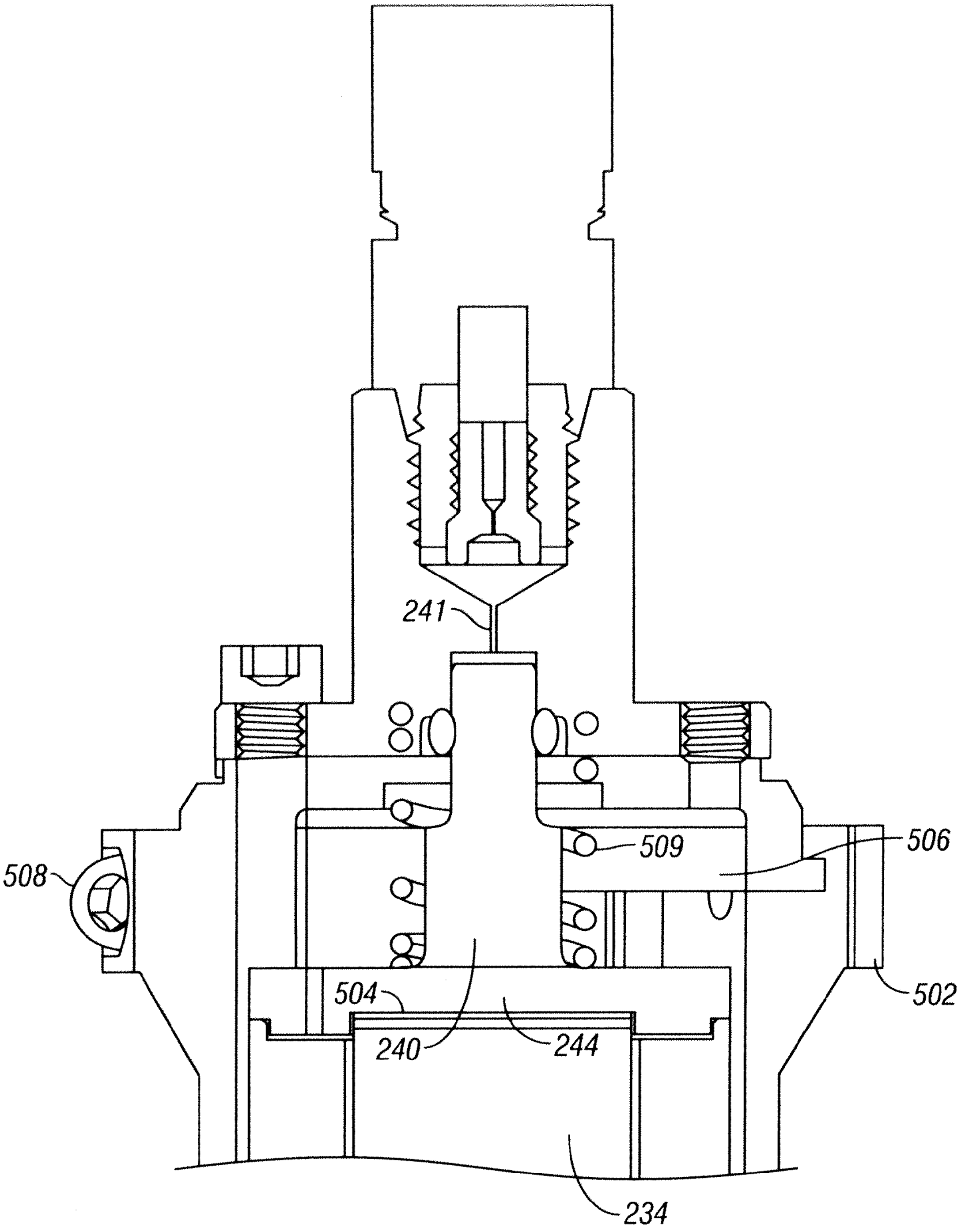
FIG. 8 is a detailed view of a portion of the fuel injector, including the upper fluid chamber in accordance with the principles of the invention.
Figure 9:
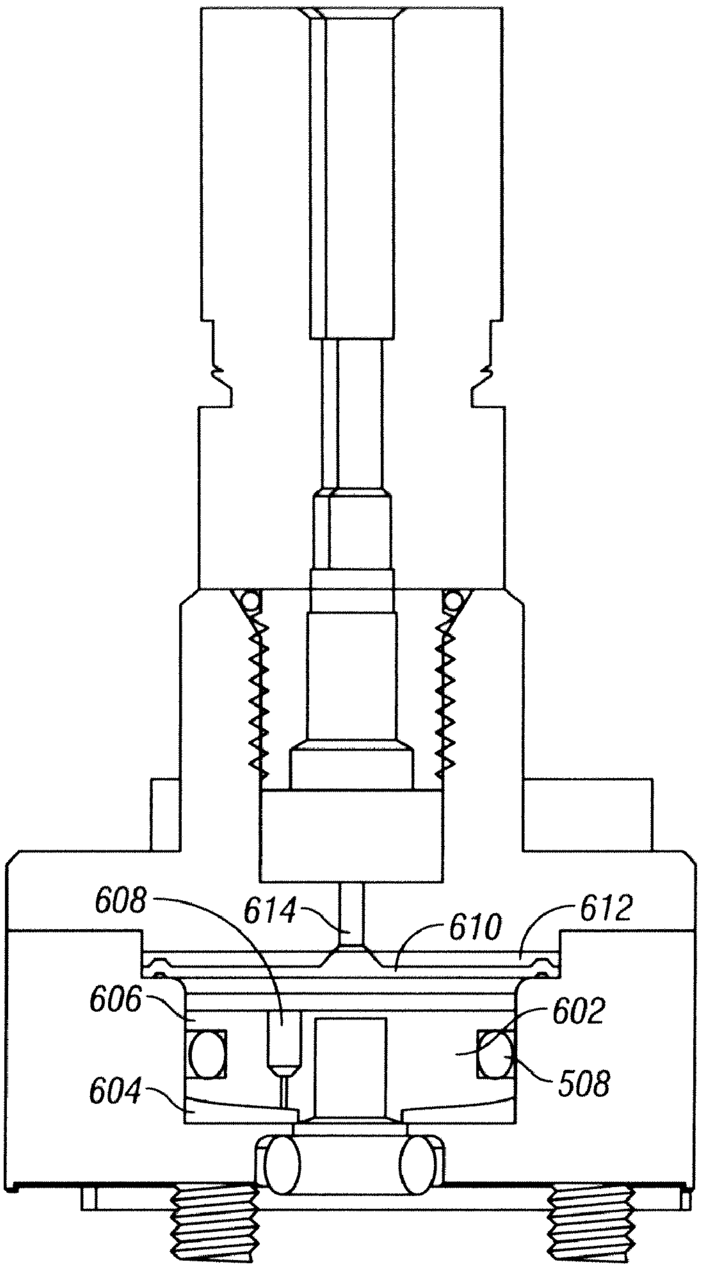
FIG. 9 is a detailed view of a portion of the piezoelectric assembly of a fuel injector according to an additional embodiment in accordance with the principles of the invention.
Figure 10:
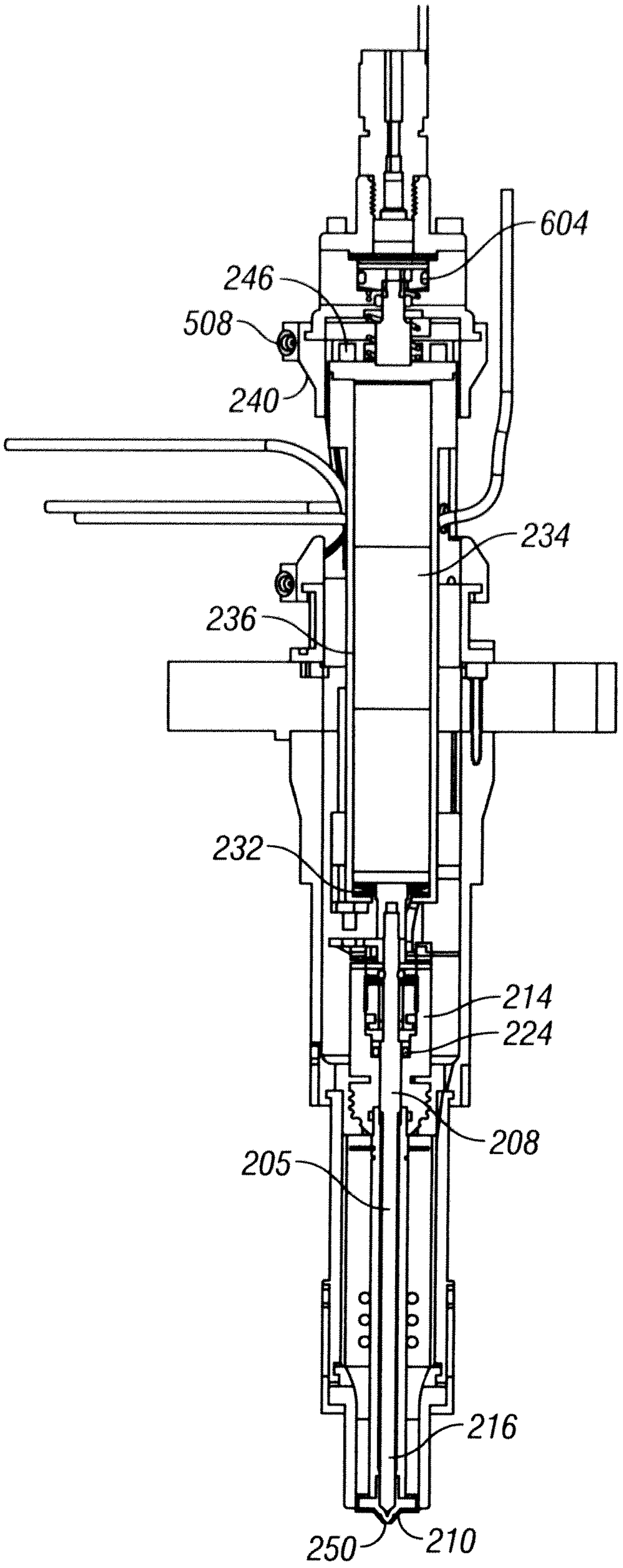
FIG. 10 is a cut away view of a fuel injector according to an additional embodiment in accordance with the principles of the invention.
Figure 11:
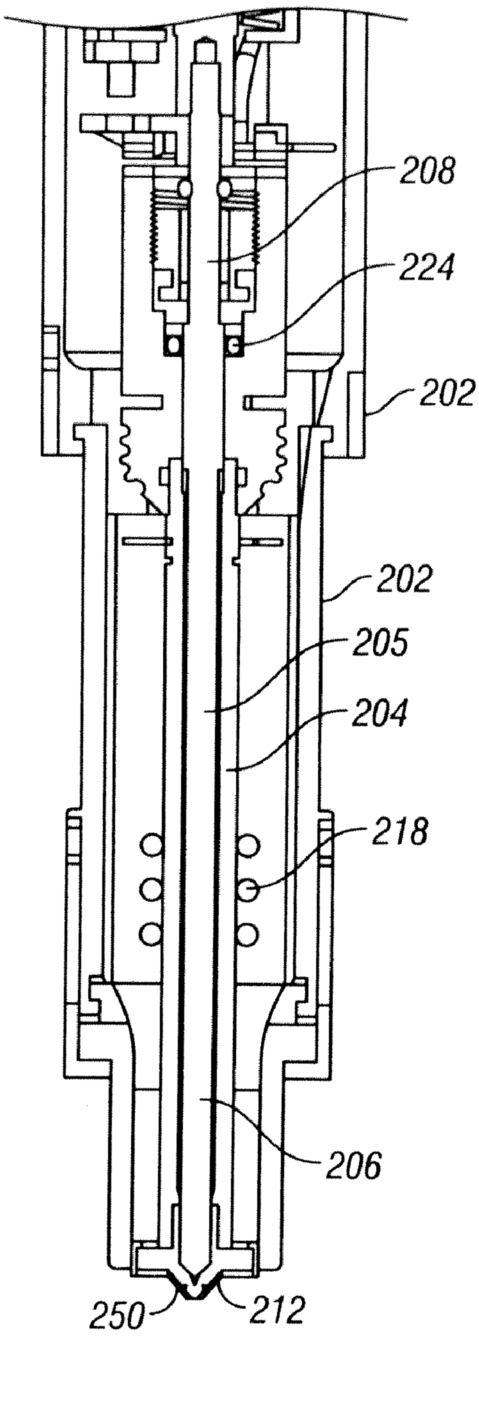
FIG. 11 is a cut away view of a fuel injector seal assembly according to an additional embodiment in accordance with the principles of the invention.
Figure 12:
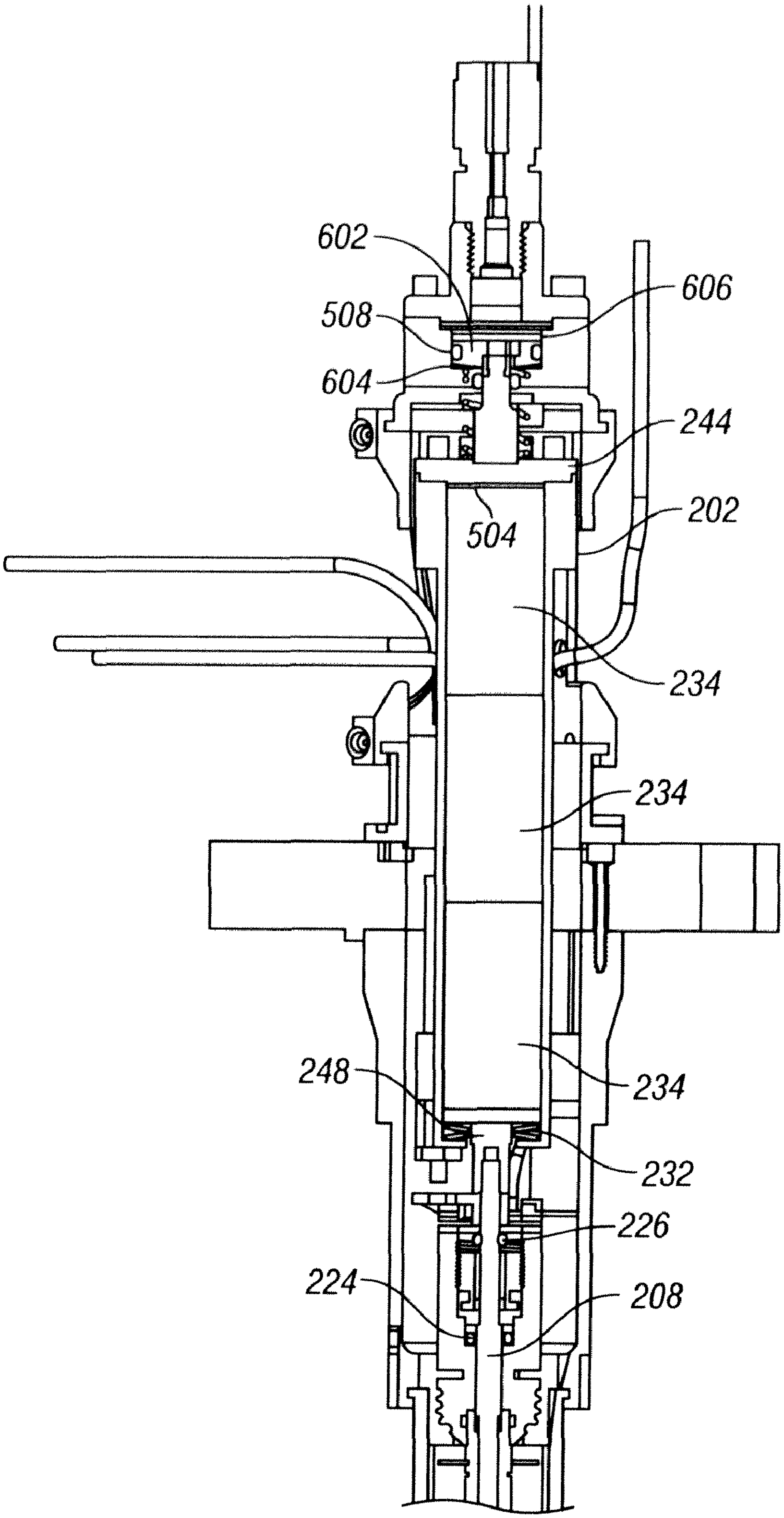
FIG. 12 is a cut away view of a fuel injector according to an additional embodiment accordance with the principles of the invention.

Referring to FIG. 8, the temperature compensator 240 is positioned at the upper end of the fuel injector. In operation, the temperature compensator 240 is used to compensate for thermal expansion of the injector element 234 and injection pin 205, and also allows for tolerance variations in the construction of the injector element, injector pin and spacers 504. The temperature compensator 240 has a flange shaped bottom portion 244 proximal to the injector element 234. The flange portion 244 is positioned inside the upper outer housing 502. In the illustrated embodiment, one or more circular spacers 504 are placed between the injector element 234 and the flange portion 244 to allow for manufacturing differences and to take up excess space between the injector element 234 and the flange portion 244. An upper fluid chamber 506 is formed between the flange portion 244 and the outer housing 502. The upper fluid chamber 506 has an inlet duct 241 that allows a fluid to flow in and out of the upper fluid chamber 506. The fluid used in the upper fluid chamber 506 can be fuel or any other suitable oil or hydraulic fluid. The inlet duct 241 can have a needle orifice or check valve to control the fluid flow. A resilient element 509, such as belleville springs, coil springs, tube springs, a non-linear spring or any other suitable device is used to bias the flange portion 244 toward the injector element 234. A compensator seal 508 such as an o-ring, ground sliding, bellows, lip seal, wiper, labyrinth or any other appropriate sealing mechanism, can be positioned between the outer peripheral edge of the flange portion 244 and the upper outer housing to create the upper fluid chamber 506. The temperature compensator 240 functions by viscous damping or creating a dynamic pressure differential between the fluid chamber 506 and the inlet duct 241.

Referring to FIGS. 9-12, an alternative embodiment of the temperature compensator is illustrated. As illustrated, the flange portion 244 is positioned inside the upper housing 202. A plurality of circular spacers 504 can be placed between the injector element 234 and the flange portion 244 to allow for manufacturing differences and to take up excess space between the injector element 234 and the flange portion 244. A piston disk 602 is attached to the flange portion 244 forming a second fluid chamber 604 and a third fluid chamber 606. A compensator seal 508 such as an o-ring, ground sliding, bellows, lip seal, wiper, labyrinth or any other appropriate sealing mechanism, can be positioned between the outer peripheral edge of the piston disk 602 and the upper housing 202 to create the second fluid chamber 604 and the third fluid chamber 606. The piston disk 602 has a duct 608 that fluidly connects the second fluid chamber 604 and third fluid chamber 606 so that fluid can freely flow between the chambers to create a damping action. A diaphragm 610 forms an upper wall of the second fluid chamber 602 to forma floor of a fourth fluid chamber 612 in the upper outer housing 502. The fourth fluid chamber 612 has an inlet duct 614 that allows fuel pressure into the fourth fluid chamber which in turn exerts a downward pressure on the diaphragm 610.

It is envisioned that as the injector pin 205 expands due to an increase in temperature, the flange portion 244 is pushed in an upward direction. As the flange portion 244 is pushed in an upward direction, the piston disk 602 is likewise pushed in an upward direction. The fluid contained in the second fluid chamber 604 is expanded and fluid from the third fluid chamber 606 is drawn into the second fluid chamber 604. The fuel pressure acts on the opposite side of the diaphragm 610 in the fourth fluid chamber 612 to push against the fluid pressure in the third fluid chamber 606. The piston disk 602 is allowed to move in an upward direction as the fluid flows from the second fluid chamber 604 to the third fluid chamber 606 to dampen thermal expansion of the injector pin 205.

The manner of operating various embodiments of the invention are now described. Referring to FIG. 5, in a first embodiment, the fuel is first pressurized to the correct pressure and allowed to flow into the upper fluid chamber 246 and the lower fluid chamber 216. The heating element 218 around the lower fluid chamber 216 is heated allowing the fuel to reach a supercritical state.

The injector element is slowly charged to operating voltage to close the injector pin against the injector seat 212 to create a fluid tight seal. When the fuel injector is in a closed position, pressurized fuel is pumped in through the input port 242 into the lower fluid chamber 216. The upper fluid chamber 246 is filled with fuel pressurized at the substantially the same pressure as the fuel in the lower fluid chamber 216. The fuel is allowed to flow into the upper fluid chamber 246 by way of the inlet duct 241. The charge to the injector element 234 is then dropped to allow the injector pin 205 to lift off of the injector seat 212. The fuel is then allowed to flow out of the fuel injector into the combustion chamber.

In order to close the injector, the charge supplied to the injector element 234 is increased causing the injector element 234 to push the injector pin 205 against the injector seat 212, sealing the fuel injector. At the same time, the temperature compensator flange 244 is pushed against by the injector element 234. The temperature compensator 240 acts as an adjustable reference plane against which to push/pull the injector pin 205. This motion, in turn, pushes some of the fluid out of the upper fluid chamber 246 through the orifice 250. The action of the liquid fuel flowing out of the upper fluid chamber 246 acts as both a temperature compensator and damper for the piezoelectric injector.

In a second embodiment, the fuel injector is actuated using a pressure differential. The fuel pressure in the lower chamber 246 is different than the fuel pressure provided to the temperature compensator 240. In this embodiment, the fuel pressure in the lower fluid chamber 216 is higher than the fuel pressure in the upper fluid chamber 246, which biases the injector pin 205 to an open position. In an alternative configuration, the fuel pressure provided to the lower fluid chamber 216 is lower than the fuel pressure provided to the upper fluid chamber 246 so that the injector pin 205 is biased to a closed position.

Referring to FIGS. 9-12, in a third embodiment, the fuel injector is actuated using damping fluid at the temperature compensator 240. In this embodiment, pressurized damping fluid with a higher viscosity than fuel is used in the second fluid chamber 604 and third fluid chamber 606. Fuel is pumped into the fourth fluid chamber 612, which causes the injector pin 205 to be biased to a closed position. Fuel or other pressurized gas is pumped into the lower fluid chamber 216 at a pressure substantially equal to the fuel or gas pumped into the fourth fluid chamber 612, and the pressure of the damping fluid biases the injector pin into an open position. The opposing forces of the fuel in the lower fluid chamber 216 and the fourth fluid chamber 612, combined with the damping fluid pressure, hold the injector pin 205 in a pressure neutral state.

In a fourth embodiment, the fuel injector is actuated with both fuel and a damping fluid. In this embodiment, a pressurized damping fluid with a higher viscosity than fuel is used in the second fluid chamber 604 and third fluid chamber 606. Fuel or other pressurized gas is pumped into the fourth fluid chamber 612, which causes the injector pin to be biased to a closed position. Fuel is pumped into the lower fluid chamber 216 at a pressure different than the fuel or gas pumped into the fourth fluid chamber 612, and the pressure of the damping fluid biases the injector pin into an open position. Depending on the pressure difference between fuel pressure in the lower fluid chamber 216 and the fuel pressure in the fourth fluid chamber 612, the injector pin can be selectively biased toward an open or closed position.

The charging and discharging of the fuel injector element for the second, third, and fourth embodiments, is substantially the same as the first embodiment.

In all of the embodiments of the present invention, the fuel can be pressurized by a common pump, separate and distinct pumps, pressure modifying devices, or any combination thereof.

In the above embodiments, the use of the piezoelectric element allows accurate and fast control of the fuel injector. In addition, the use of the temperature compensator allows for the compensation of expansion of the injector pin and also allows damping of the piezoelectric element. The heating element associated with the first fluid chamber allows for the heating of the fuel to a supercritical temperature. Furthermore, if the fuel is pressurized to a supercritical pressure, more efficient combustion results, thus saving fuel. Efficiency is further enhanced because the catalyst used in the first fluid chamber allows for the oxidation of the fuel or conversion of the fuel, resulting in more efficient combustion when the fuel is released.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description ay practice the invention as well.

While various embodiments of the present invention have been described above, it should be understood that the have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. An apparatus, comprising:

a housing having a sealable injector seat;

a fuel injector pin disposed within the housing proximate to the injector seat such that the injector seat may be sealed and unsealed by displacing the fuel injector pin;

a resilient element biasing the fuel injector pin in an unsealed direction;

a piezoelectric actuator disposed within the housing proximal to the fuel injector pin configured to actuate to force the injector pin towards the injector seat to seal the injector seat;

a thermal compensating unit comprising a fluid chamber in fluid communication with a fuel source and disposed within the housing proximal to the actuator and configured to compensate for thermal expansion or contraction of a component of the fuel injector.

2. The apparatus of claim 1, wherein the thermal compensating unit is configured to compensate for thermal expansion or contraction of the component by viscous dampening or hydraulic pressure.

3. The apparatus of claim 1, wherein the thermal compensating unit further comprises a second resilient element configured to provide a biasing force on the actuator towards the injector seat.

4. The apparatus of claim 3, wherein the thermal compensating unit further comprises a thermal compensator disposed within the housing to transfer force from the resilient element and fluid chamber to the actuator.

5. The apparatus of claim 1, wherein the apparatus is configured such that the fuel in the fluid chamber has substantially equal pressure as fuel in the fuel chamber prior to fuel injection.

6. An apparatus, comprising:

an internal combustion engine having a plurality of cylinders;

a fuel source; and a plurality of fuel injectors in fluid communication with the fuel source and the cylinders and configured to deliver fuel from the fuel source to the plurality of cylinders during engine operation;

wherein a fuel injector of the plurality of fuel injectors comprises:

a housing having a sealable injector seat;

a fuel injector pin disposed within the housing proximate to the injector seat such that the injector seat may be sealed and unsealed by displacing the fuel injector pin;

a resilient element biasing the fuel injector pin an unsealed direction;

a piezoelectric actuator disposed within the housing proximal to the fuel injector pin configured to actuate to force the injector pin towards the injector seat to seal the injector seat; and a thermal compensating comprising a fluid chamber in fluid communication with a fuel source and disposed within the housing proximal to the actuator and configured to compensate for thermal expansion or contraction of a component of the fuel injector.

7. The apparatus of claim 6, wherein the thermal compensating unit is configured to compensate for thermal expansion or contraction of the component by viscous dampening or hydraulic pressure.

8. The apparatus of claim 6, wherein the thermal compensating unit further comprises a second resilient element configured to provide a biasing force on the actuator towards the injector seat.

9. The apparatus of claim 8, wherein the thermal compensating unit further comprises a thermal compensator disposed within the housing to transfer force from the resilient element and fluid chamber to the actuator.

10. The apparatus of claim 6, wherein the apparatus is configured such that the fuel in the fluid chamber has substantially equal pressure as fuel in the fuel chamber prior to fuel injection.

11. An apparatus, comprising:

an internal combustion engine having a plurality of cylinders;

a fuel source; and a plurality of fuel injectors in fluid communication with the fuel source and the cylinders and configured to deliver fuel from the fuel source to the plurality of cylinders during engine operation;

wherein a fuel injector of the plurality of fuel injectors comprises:

a housing having a sealable injector seat;

a fuel injector pin disposed within the housing proximate to the injector seat such that the injector seat may be sealed and unsealed by displacing the fuel injector pin;

a resilient element biasing the fuel injector pin an unsealed direction;

a piezoelectric actuator disposed within the housing proximal to the fuel injector pin configured to actuate to force the injector pin towards the injector seat to seal the injector seat; and a thermal compensating unit disposed within the housing proximal to the actuator and configured to compensate for thermal expansion or contraction of a component of the fuel injector, wherein the thermal compensating unit comprises a fluid chamber in fluid communication with a fuel source.

12. The apparatus of claim 11, wherein the thermal compensating unit is configured to compensate for thermal expansion or contraction of the component by viscous dampening or hydraulic pressure.

13. The apparatus of claim 11, wherein the thermal compensating unit further comprises a second resilient element configured to provide a biasing force on the actuator towards the injector seat.

14. The apparatus of claim 13, wherein the thermal compensating unit further comprises a thermal compensator disposed within the housing to transfer force from the resilient element and fluid chamber to the actuator.

* * * * *

UNITED STATES PATENT AND TRADEMARK OFFICE

CERTIFICATE OF CORRECTION

PATENT NO. : 7,992,545 B2
APPLICATION NO. : 12/817136
DATED : August 9, 2011
INVENTOR(S) : Michael J. Frick et al.

It is certified that error appears in the above-identified patent and that said Letters Patent is hereby corrected as shown below:

Title page, item (57) in the Abstract, after the word proximate, please delete “)”.

Col. 1 line 44 in the Title; SUMMARY OF TH INVENTION” should read “SUMMARY OF THE INVENTION”.

Col. 1, line 46, of the invent on...; should read “invention”.

Col. 2, line 41, please insert --in-- after embodiment.

Col. 10, line 25, please insert --and-- after injector seat.

Signed and Sealed this
Eleventh Day of October, 2011

David J. Kappos

David J. Kappos
*Director of the United States Patent and Trademark Office*